INVENTORS
Howard F. Goeckel and
BY Charles R. Boicey
Nobbe & Swope
ATTORNEYS

United States Patent Office 3,323,204
Patented June 6, 1967

3,323,204
METHOD OF SEALING METAL TO GLASS
Howard F. Goeckel, Temperance, Mich., and Charles R. Boicey, Toledo, Ohio, assignors to Libbey-Owens-Ford Glass Company, Toledo, Ohio, a corporation of Ohio
Filed Oct. 11, 1963, Ser. No. 315,476
9 Claims. (Cl. 29—473.1)

The present invention relates broadly to metal seals. More particularly it has to do with the production of such seals in the manufacture of multiple glass sheet glazing units and to a novel flux composition for use therein.

While in no way restricted thereto, the metal seals and the special flux compositions of this invention are especially well adapted for use in producing multiple glass sheet glazing units of the so-called metal to glass type disclosed in U.S. Patent No. 2,235,680 to Haven et al. and they will be specifically described in that connection here.

As is well known, such units comprise two or more sheets or plates of glass arranged in spaced, face to face relation and provided with metalized coatings around their inner margins. The space between the sheets is hermetically sealed by a metal separator strip extending around the perimeter of the space and having its edges soldered to the metalized coatings on the facing margins of the glass sheets.

Soldering of the metal separator to the metalized coatings in a manner to produce an effective and permanent air, moisture and weather-tight seal presents some unusual problems because it must be performed as a production line operation and, at least in part, in the limited working area between the opposed glass sheets. Further problems are presented by the differences in coefficients of expansion of the glass and of the different metals employed, the undesirability of flux penetration into the units, and the extreme and varied conditions to which these units will be subjected in use.

It is therefore the primary object of this invention to provide an improved method of producing such units with a permanent metal to metal and metal to glass seal that is impervious to air, dirt and moisture under all of the conditions which such units may encounter.

Another object is the provision, for use in such a method, of a special, active, paste-type flux that will facilitate rapid soldering; will minimize the possibility of leakage through the solder joint; will permit reworking of the solder without additional flux application; will minimize oxidation during soldering; will mix well; will have good pickup and transfer characteristics; will apply uniformly; will retain its desirable consistency; will spread well and work easily; will adhere well; will not separate or objectionably fume, smoke, char or carbonize; and will be readily washable from the work.

Another, and ancillary object is to provide such a flux which will reduce oxides rapidly; will lower the surface tension of the solder; will not volatilize or disassociate at working temperatures; and will maintain good consistency, i.e., firmness, viscosity, low granularity of solids and tackiness.

Briefly stated, the special flux composition of this invention that is designed to provide these features comprises essentially a basic flux ingredient, water, an emulsifier and a wetting agent; with or without an oil and/or activating or fortifying salts.

Further objects and advantages of the invention will become apparent in the course of the following description when taken in connection with the accompanying drawings.

In the drawings wherein like numerals refer to like parts throughout:

Figure 1:
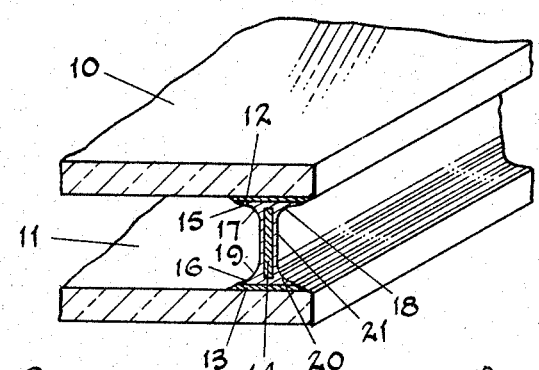
FIG. 1 is a sectional perspective view of one corner of an hermetically sealed multiple glass sheet glazing unit that has been sealed in accordance with the invention.

Referring now more particularly to the drawings, a representative two-sheet type of the metal to glass type multiple glass sheet unit that has been hermetically sealed in accordance with this invention is illustrated in FIG. 1 and, as there shown, comprises two sheets of glass 10 and 11 provided with metalized coatings 12 and 13 around their margins to which are soldered the opposite edges of a separator strip 14 through the intermediary of solder coatings 15, 16 and 21 and solder fillets 17, 18, 19 and 20.

It is already known that very thin metalized layers on glass, such as those at 12 and 13, that are permanent and tightly adherent and that will not tear or separate from the glass can be obtained by spraying metal such as copper or a copper alloy fed in the form of a wire to a suitable gun. It is also known that such metalized layers can be satisfactorily tinned, or spray-tinned without the use of a flux, to provide layers of low melting point solder such as at 15 and 16 thereon. Similarly, it is known (see U.S. Patent 2,800,416 to E. L. Walters) that a ductile metal strip can be tinned by a continuous process to provide a layer or layers of a low melting point solder as shown at 21 on the surface thereof.

The solder employed in applying the coatings 15, 16 and 21 is preferably a low melting point solder in order to avoid unnecessarily high working temperatures which may result in the setting up of strains between the metalized coating and the glass. It is also preferred to employ a solder with a wide plastic range of melting to simplify the assembly operation. Such solders are also well known.

In practicing the present invention it is preferred that the glass sheets 10 and 11 be provided with metalized coatings 12 and 13, tinned as at 15 and 16, along all four margins of what are to be their facing surfaces in the finished unit and that a separator strip 14 of a ductile metal such as lead be provided with a solder coating 21 (FIG. 2) by already known and accepted procedures.

Figure 2:
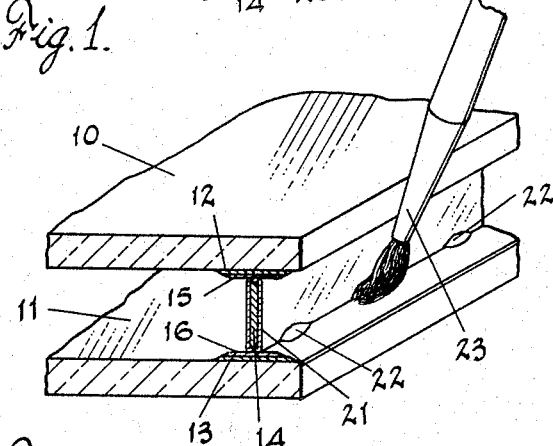
FIG. 2 is a similar view of the assembled unit prior to final sealing and illustrating diagrammatically the application of flux to the parts to be finally soldered.

The next step is to assemble the tinned separator strip and the metalized and tinned glass sheets into the desired relationship as shown in FIG. 2 and then, by means of a heated iron for example, tack them lightly together in this assembled relationship, as at spaced points 22 in FIG. 2, in preparation for the final joining step of sweating the separator and glass together around the periphery of the unit to hermetically seal the space between the sheets.

After tacking, the assembled unit is prepared for the running of the final solder joints by applying a special flux along the lines of joinder with a brush or similar applicator as shown at 23 (FIG. 2).

According to the present invention remarkably efficient fluxes for this purpose can be made up of a basic flux material, which is preferably zinc chloride, water with or without a solvent such as isopropyl alcohol, an emulsifier and a wetting agent; to which may be added oils such as peanut oil or kerosene and/or salts such as ammonium chloride and stannous chloride to fortify the basic fluxing ingredient.

Among the advantages of these special fluxes are that they can be readily picked up on a brush, that they will transfer readily to the surface to be tinned and that they will act to reduce oxides while at the same time lowering the surface tension of the solder so as to provide efficient working characteristics.

Ranges of amounts of the several ingredients for and a number of specific examples of preferred fluxing materials of the invention are set forth below and arranged in three series which are termed the A, B and C Series for purposes of discussion.

The compositions of the fluxes in the A-Series preferably include the following ingredients in the indicated ranges:

A-Series

| | | |
|---|---|---|
| Basic flux ingredient | g | 100 |
| Water | ml | 2–20 |
| Oil | ml | 2–50 |
| Emulsifier | ml | 0.25–10 |
| Wetting agent | ml | 0.25–15 |

The compositions of the fluxes in the B-Series preferably include the following ingredients in the indicated ranges:

B-Series

| | | |
|---|---|---|
| Basic flux ingredient | g | 100 |
| Water | ml | 0–2 |
| Solvent | ml | 10–35 |
| Oil | ml | 0–2 |
| Emulsifier | ml | 0.25–2.5 |
| Wetting agent | ml | 0.25–2.5 |

The composition of the fluxes in the C-Series preferably include the following ingredients in the indicated ranges:

C-Series

| | | |
|---|---|---|
| Basic flux ingredient | g | 100 |
| Flux fortifiers | g | 15–140 |
| Water | ml | 2–20 |
| Oil | ml | 2–50 |
| Solvent | ml | 0–35 |
| Emulsifier | ml | 0.25–10 |
| Wetting agent | ml | 0.25–15 |

Two specific examples of the fluxing materials of the invention in each of the A, B, and C-series are set forth below:

A-Series

A-1

| | | |
|---|---|---|
| Zinc chloride | g | 100 |
| Water | ml | 7 |
| Kerosene | ml | 7 |
| Sorbitan monooleate | ml | 0.75 |
| Alkyl aryl polyether alcohol | ml | 0.75 |

A-2

| | | |
|---|---|---|
| Zinc chloride | g | 100 |
| Water | ml | 15 |
| Peanut oil | ml | 30 |
| Sorbitan monooleate | ml | 5 |
| Alkyl aryl polyether alcohol | ml | 10 |

B-Series

B-1

| | | |
|---|---|---|
| Zinc chloride | g | 100 |
| Water | ml | 1 |
| Isopropyl alcohol | ml | 20 |
| Kerosene or peanut oil | ml | 1 |
| Sorbitan monooleate | ml | 0.75 |
| Alkyl aryl polyether alcohol | ml | 0.75 |

B-2

| | | |
|---|---|---|
| Zinc chloride | g | 100 |
| Isopropyl alcohol | ml | 25 |
| Sorbitan monooleate | ml | 0.75 |
| Alkyl aryl polyether alcohol | ml | 0.75 |

C-Series

C-1

| | | |
|---|---|---|
| Zinc chloride | g | 100 |
| Ammonium chloride | g | 35 |
| Stannous chloride | g | 10 |
| Water | ml | 12 |
| Kerosene | ml | 12 |
| Sorbitan monooleate | ml | 1 |
| Alkyl aryl polyether alcohol | ml | 1 |

C-2

| | | |
|---|---|---|
| Zinc chloride | g | 100 |
| Ammonium chloride | g | 35 |
| Stannous chloride | g | 10 |
| Water | ml | 15 |
| Peanut oil | ml | 30 |
| Sorbitan monooleate | ml | 5 |
| Alkyl aryl polyether alcohol | ml | 10 |

It will be seen that the fluxes in the A-Series all include the essential ingredients of a basic fluxing material, water, an emulsifier and a wetting agent; as well as a stable oil which is desirable to improve consistency and provide a protective film against oxidation during soldering.

The B-Series are similar except that they include a solvent or vehicle in addition to water and which improves consistency and workability and prevents hardening B-2 contains no specified water but, since commercial isopropyl alcohol has a water content of roughly 9%, the essential water is present in this form as well as in that picked up from the air. B-2 also omits oil but this is only to illustrate a form of the improved flux that will be completely odorless.

The C-Series differ from the others by including flux fortifiers such as ammonium chloride and stannous chloride which salts will enhance the fluxing action of the basic fluxing ingredient where desirable and give improved spreading of the solder.

In mixing any of these flux materials it is preferred that the following procedure be used. First, mix the emulsifier with the oil, when used; second, mix the wetting agent with the solvent or vehicle used; and finally, mix these combined materials together, with the activating salts when the latter are employed.

The resulting flux mixture will be found to be a paste of excellent consistency for the purpose, especially as to firmness, viscosity, granular condition of the solids and tackiness.

Moreover it will facilitate rapid soldering and reduce the possibility of leakage and will not volatilize or disassociate at working temperatures so that residual flux will always be available for reworking without additional flux application.

Figure 3:
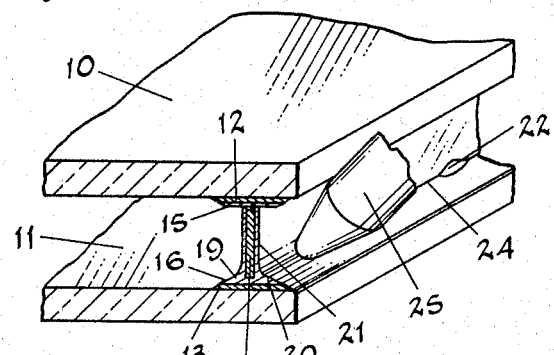
FIG. 3 is a similar view showing one way of bonding or sweating the metal separator strip to the metalized coatings on the glass sheets.

After the parts in the vicinity of a line of joinder such as at 24 between one of the tinned metalized coatings on the glass and a tinned edge of the separator strip have been fluxed as described above, the next step is to elevate the temperature of the solder deposits 21 on the separator strip 16 on the metalized glass sheet to induce flowing of the solder to sweat the parts together and produce a fillet 20 on the outside of the separator strip and a second fillet 19 on the inside as best shown in FIG. 3, where this is illustrated as being done by means of an electric soldering iron 25. Obviously the sweating may be done by other heating means but the soldering iron is generally preferred and, when properly used, will produce a continuous, effective weather, air and watertight hermetic seal that will last for years.

This is extremely important because the space between the glass sheet in the sealed unit is subsequently evacuated and filled with dry air and the presence anywhere in the seal of even the tiniest pinhole will permit the entry of moisture vapor into the evacuated unit that will in time render it defective because of objectionable fogging.

One of the principal advantages of the flux of this invention is that it not only facilitates rapid soldering but also minimizes the possibility of the presence of even the smallest leaks in the seal. One reason for this is the fact that the special flux will not volatilize or disassociate at working temperatures and so insures leaving sufficient residual flux at the joint to permit repeated reworking without the necessity of an additional flux application.

An ancillary advantage of this is to permit sufficient working during the sweating operation so that, with substantial deposits of solder on both sides of the separator strip, adequate heat can be applied from the outside to cause the necessary flowing of the solder on both sides to form the fillets 19 and 20 as shown in FIG. 3.

The special fluxes of this invention have proved to be ideally suited for use in producing units of the above character in the manner just described and they possess all of the properties necessary in and important to the most efficient and commercially satisfactory procedures for producing the same.

In the examples given above, specific materials have been named as those preferred for use as the primary fluxing ingredient, the vehicle, the source of water, the oil, the fortifiers, the emulsifier and the wetting agent. However other specifically different materials having the same properties can be substituted therefor without materially reducing the effectiveness and desirability of the new fluxes.

Thus, zinc chloride is generally preferred as the basic fluxing ingredient because it reduces oxides rapidly, lowers the surface tension of the solder to facilitate rapid soldering and minimizes leaks; will not volatilize or disassociate at working temperatures and so leaves a residue that permits reworking without further flux application. However, other basic flux materials such as glutamic acid hydrochloride and urea, and certain proprietary fluxes such as the National Lead Company's DW Flux may be employed in the mixture with good results.

The water in the mixture is extremely important because it has a peculiarly efficient effect in improving consistency by reducing granularity. In addition, it improves workability and prevents hardening and must be present in one form or another to insure best results.

The effect of the isopropyl alcohol is similar to that of the water and one of its advantages is that commercial isopropyl alcohol contains about 9% water. However, other solvents such as methyl alcohol, ethyl alcohol and acetone may be substituted for the isopropyl alcohol, particularly when water, as such, is also present.

The oils are also important to the paste-like consistency of these special fluxes and they materially aid the fluxing action by providing a protective film of oil to prevent oxidation during soldering. Oils such as peanut oil and kerosene are preferred because fumes and smoke, which result when materials such as petrolatum, glycerine, glycols, etc., are used are least noticeable from peanut oil and/or kerosene, as is objectionable charring or carbonizing. Some slight odor can be noticed even with these oils and, for this reason, the special fluxes in the B-Series are formulated to eliminate any possible objection from odor through reduction or elimination of the oils. However, where possible it is preferred to use some peanut oil or kerosene and/or other oils with similar properties such as cotton seed oil, soya bean oil and palm oil.

An emulsifier such as sorbitan monooleate is important to prevent separation of the oils and their collection on top of the paste. It also acts to increase tackiness and prevent hardening of the flux. However, other available emulsifying agents such as sorbitan trioleate, polyoxyethylene sorbitan trioleate, modified phthalic glycerol alkyd resin, organic phosphate esters, and polyoxyethylene lauryl ether having similar properties may be used in lieu of the sorbitan monooleate.

A wetting agent such as the alkyl aryl polyether alcohol is important because it improves washability and permits complete removal of residual flux after the sealing operation. Other commercially available wetting agents such as alkyl aryl ether, alkyl aryl sodium sulfonate, alkyl phenoxy polyoxyethylene ethanol, and sulfated propyl oleate will give similar results.

The ammonium chloride and stannous chloride are flux fortifiers used to supplement or enhance the action of the basic fluxing ingredients where this is necessary but other flux fortifying materials such as hydrochloric acid and orthophosphoric acid may also be used.

Accordingly it is to be understood that the forms of the invention herewith described are to be taken as illustrative embodiments only of the same and that various procedural and compositional changes may be resorted to without departing from the spirit of the invention.

We claim:

1. A method of sealing metal-to-glass type multiple sheet units, the steps of assembling a glass sheet provided with a tinned metalized coating on a surface thereof with a tinned metal separator and with said tinned members in contiguous relationship, applying a flux consisting essentially of the following ingredients within approximately the ranges of proportions indicated:

| | | |
|---|---|---|
| Zinc chloride | g | 100 |
| Water | ml | 7 |
| Kerosene | ml | 7 |
| Sorbitan monooleate | ml | 0.75 |
| Allkyl aryl polyether alcohol | ml | 0.75 | and then sweating said members together.

2. A method as defined in claim 1 in which said flux consists essentially of the following ingredients in approximately the indicated proportions:

| | | |
|---|---|---|
| Zinc chloride | g | 100 |
| Water | ml | 15 |
| Peanut oil | ml | 30 |
| Sorbitan monooleate | ml | 5 |
| Alkyl aryl polyether alcohol | ml | 10 |

3. A method as defined in claim 1 in which said flux consists essentially of the following ingredients in approximately the indicated proportions:

| | | |
|---|---|---|
| Zinc chloride | g | 100 |
| Water | ml | 1 |
| Isopropyl alcohol | ml | 20 |
| Stable oil | ml | 1 |
| Sorbitan monooleate | ml | 0.75 |
| Alkyl aryl polyether alcohol | ml | 0.75 |

4. A method as defined in claim 1 in which said flux consists essentially of the following ingredients in approximatey the indicated proportions:

| | | |
|---|---|---|
| Zinc chloride | g | 100 |
| Isopropyl alcohol | ml | 25 |
| Sorbitan monooleate | ml | 0.75 |
| Alkyl aryl polyether alcohol | ml | 0.75 |

5. A method as defined in claim 1 in which said flux consists essentially of the following ingredients in approximately the indicated proportions:

| | | |
|---|---|---|
| Zinc chloride | g | 100 |
| Ammonium chloride | g | 35 |
| Stannous chloride | g | 10 |
| Water | ml | 12 |
| Kerosene | ml | 12 |
| Sorbitan monooleate | ml | 1 |
| Alkyl aryl polyether alcohol | ml | 1 |

6. A method as defined in claim 1 in which said flux consists essentially of the following ingredients in approximately the indicated proportions:

| | | |
|---|---|---|
| Zinc chloride | g | 100 |
| Ammonium chloride | g | 35 |
| Stannous chloride | g | 10 |
| Water | ml | 15 |
| Peanut oil | ml | 30 |
| Sorbitan monooleate | ml | 5 |
| Alkyl aryl polyether alcohol | ml | 10 |

7. A method of sealing metal-to-glass type multiple sheet units, the steps of assembling a glass sheet provided with a tinned metalized coating on a surface thereof with a tinned metal separator and with said tinned members in contiguous relationship, applying a flux consisting essentially of the following ingredients within approximately the ranges of proportions indicated:

| | | |
|---|---|---|
| Zinc chloride | g | 100 |
| Water | ml | 2–20 |
| Oil | ml | 2–50 |
| Emulsifier | ml | 0.25–10 |
| Wetting agent | ml | 0.25–15 | and then sweating said members together.

8. A method as defined in claim 7, in which said emulsifier is selected from a group consisting of sorbitan trioleate, polyoxyethylene sorbitan trioleate, modified phthalic glycerol alkyd resin, organic phosphate esters, and polyoxyethylene lauryl ether.

9. A method as defined in claim 7, in which said wetting agent is selected from a group consisting of alkyl aryl ether, alkyl aryl sodium sulfonate, alkyl phenoxy polyoxyethylene ethanol and sulfated propyl oleate.

References Cited

UNITED STATES PATENTS

| | | | |
|---|---|---|---|
| 2,228,352 | 1/1941 | Hopfield | 29—495 |
| 2,235,680 | 3/1941 | Haven et al. | 161—45 |
| 2,480,723 | 8/1949 | Evans et al. | 148—24 |
| 2,774,137 | 12/1956 | Yarow | 29—495 |
| 2,800,416 | 7/1957 | Walters | 117—8 |
| 2,827,408 | 3/1958 | Freedman | 148—23 |
| 3,006,790 | 10/1961 | Ewing | 148—23 |
| 3,073,270 | 1/1963 | Johnson et al. | 148—24 |

JOHN F. CAMPBELL, *Primary Examiner.*

L. J. WESTFALL, *Assistant Examiner.*